G. A. WILLIAMS, C. L. MISSEL AND J. G. LEPPER.
BOTTLE CAPPING MACHINE.
APPLICATION FILED OCT. 16, 1913.
1,332,279.
Patented Mar. 2, 1920.
9 SHEETS—SHEET 1.
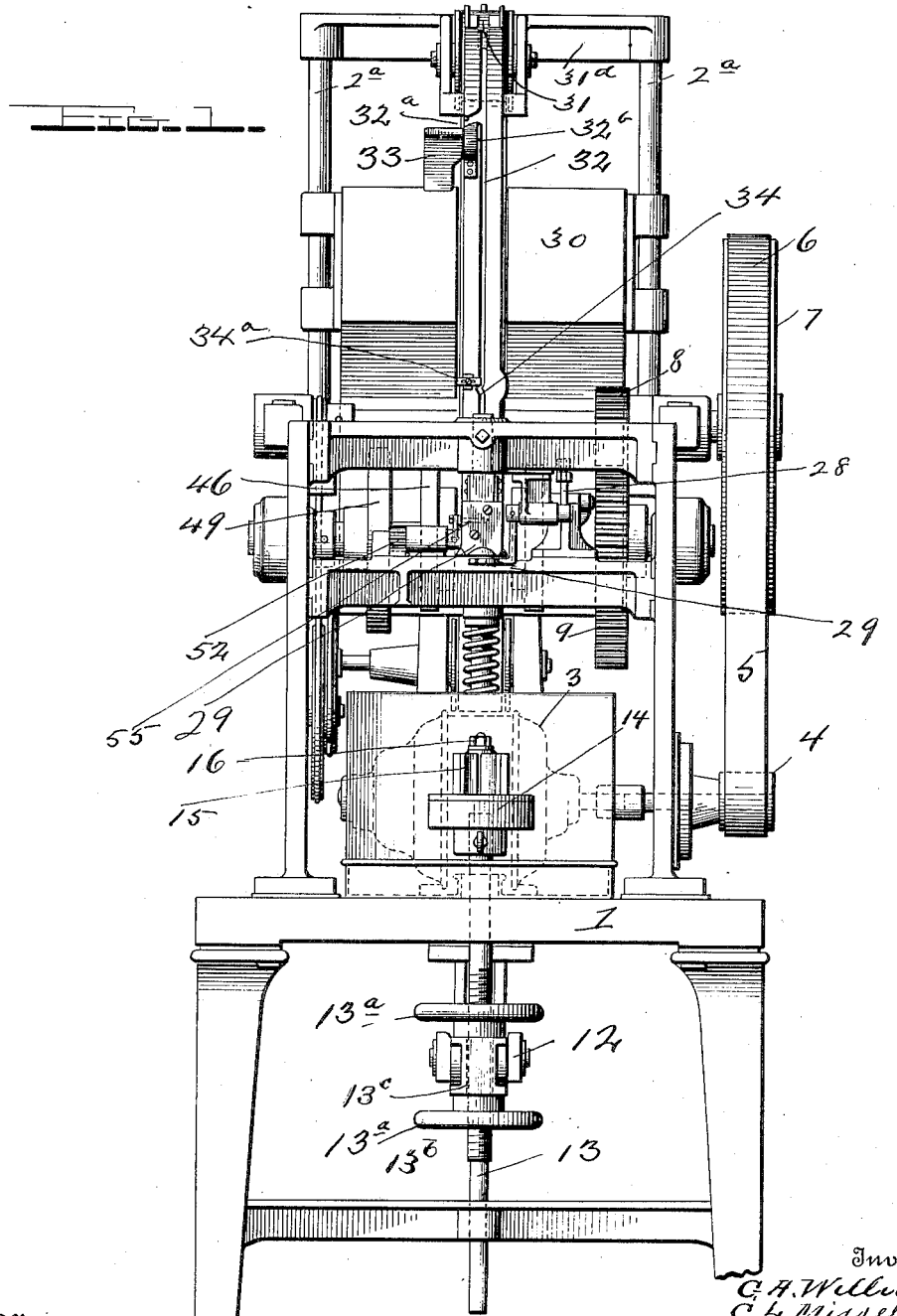

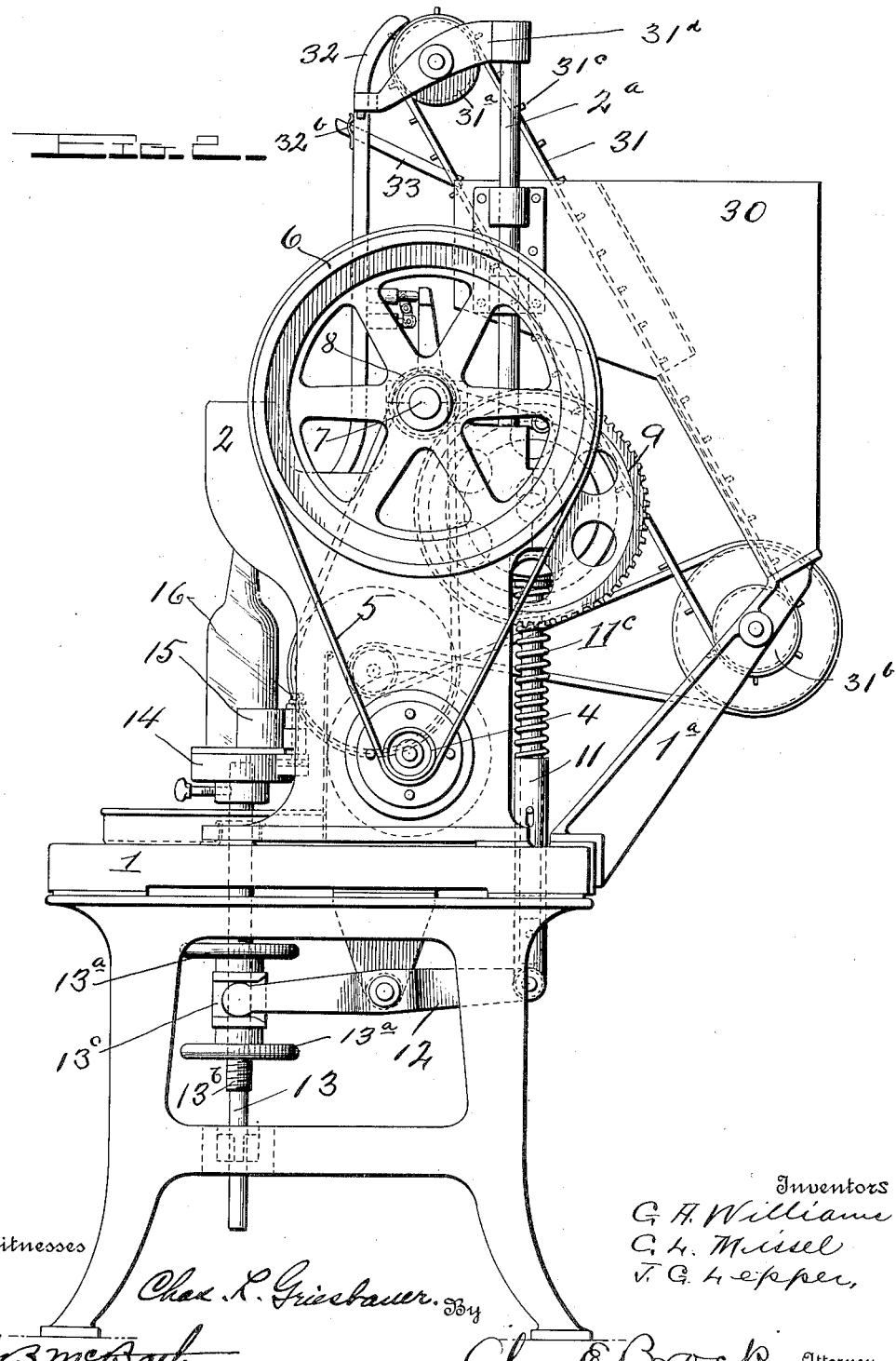

G. A. WILLIAMS, C. L. MISSEL AND J. G. LEPPER.
BOTTLE CAPPING MACHINE.
APPLICATION FILED OCT. 16, 1913.
1,332,279.
Patented Mar. 2, 1920.
9 SHEETS—SHEET 3.
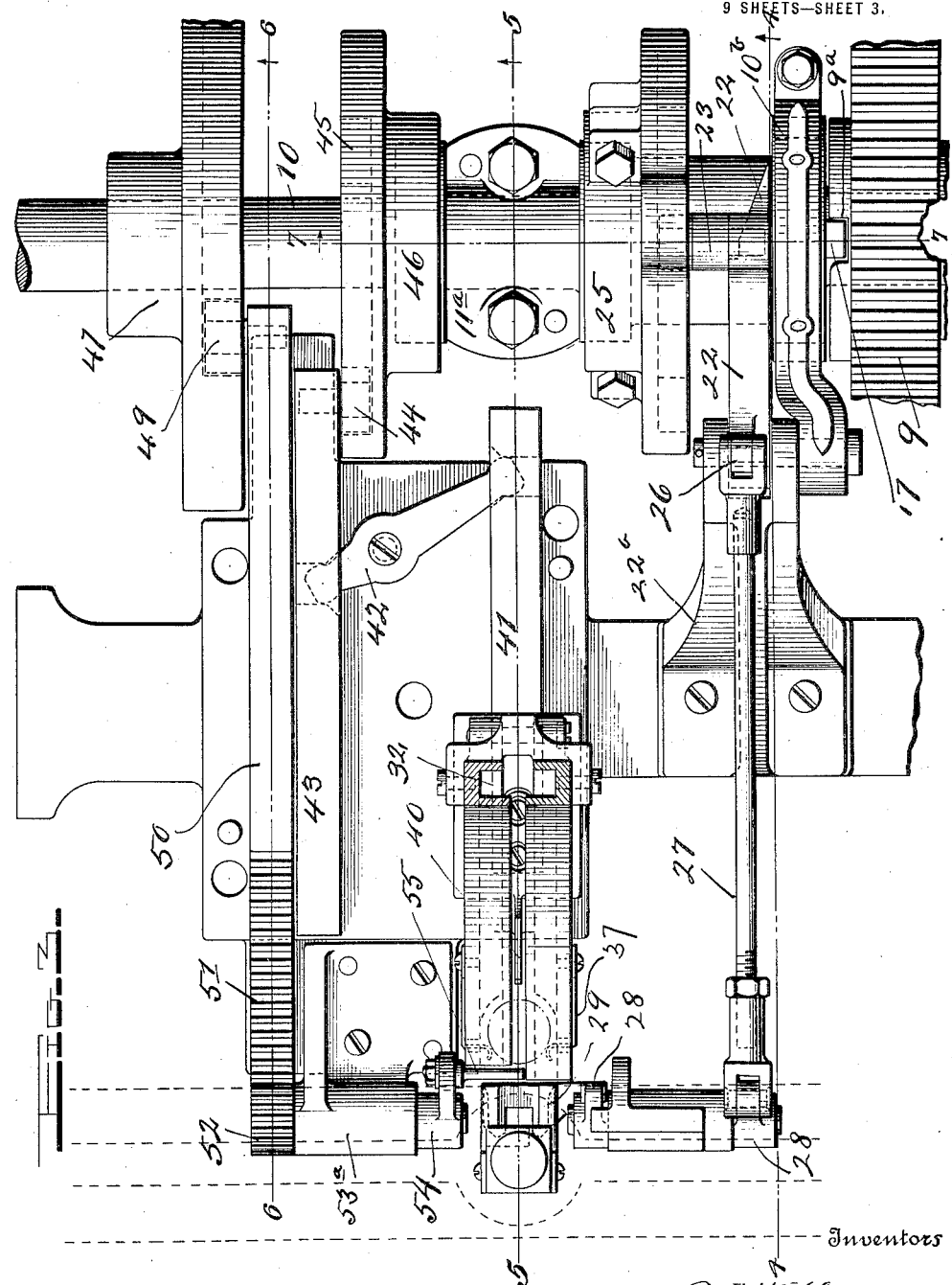

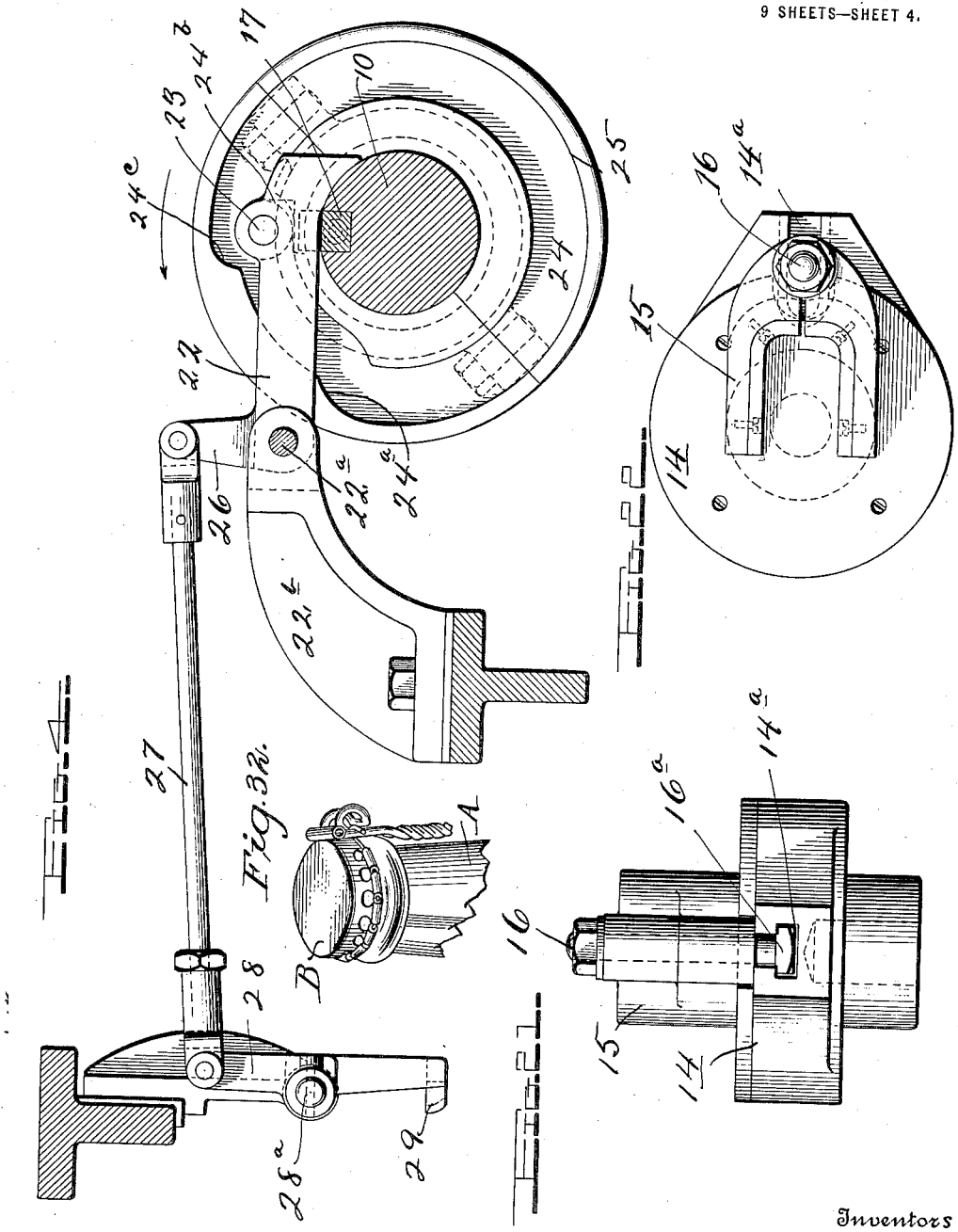

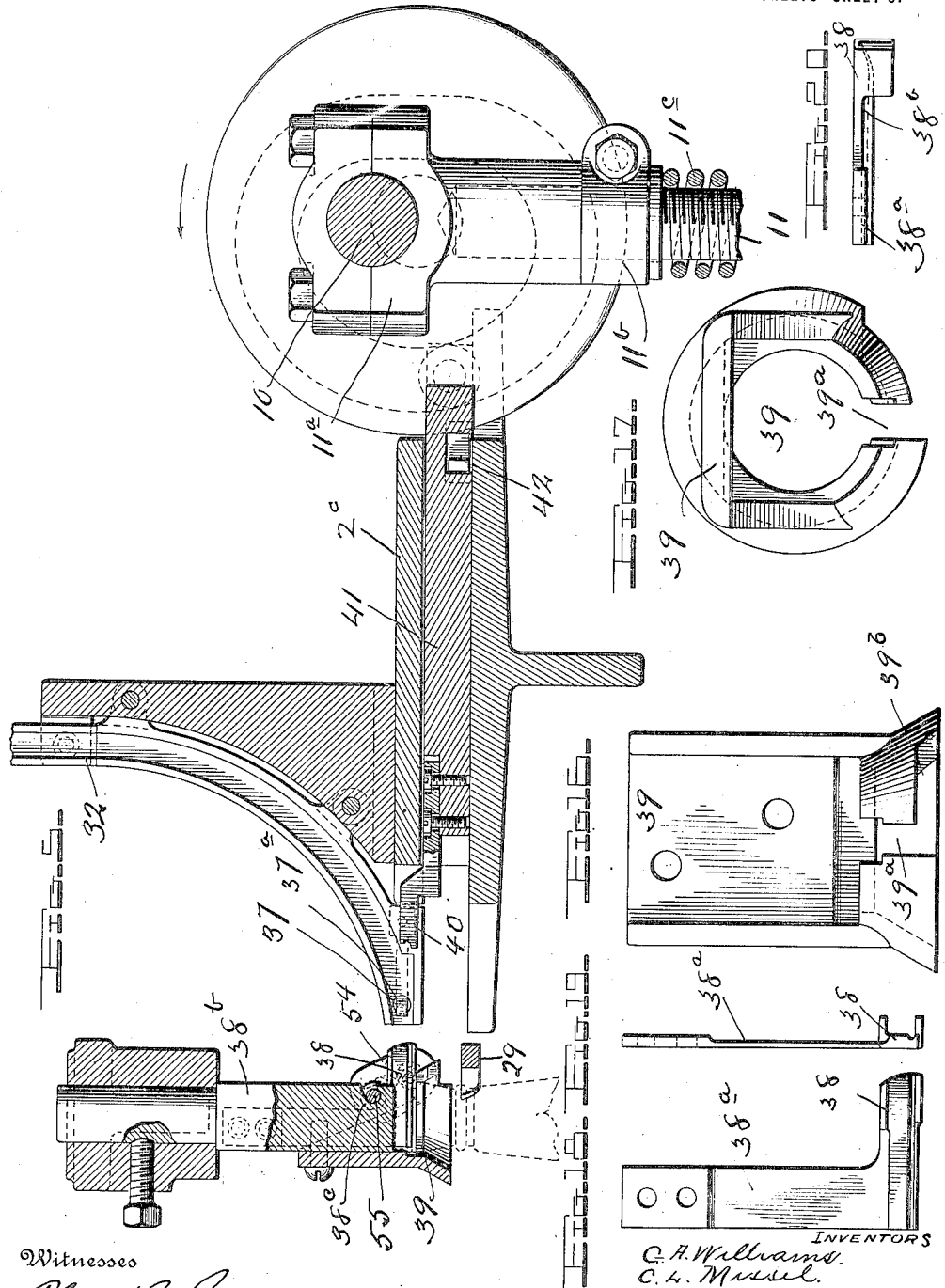

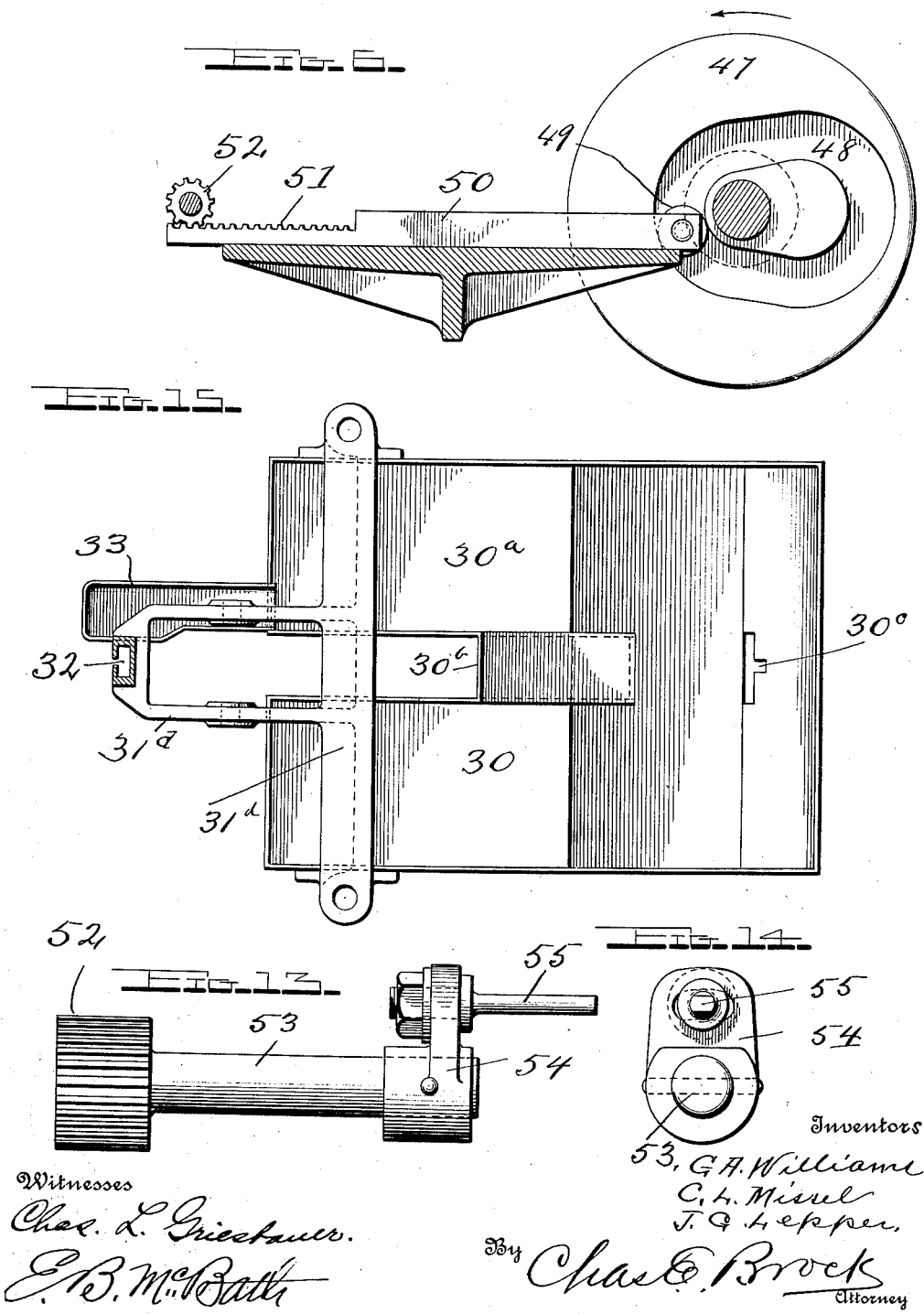

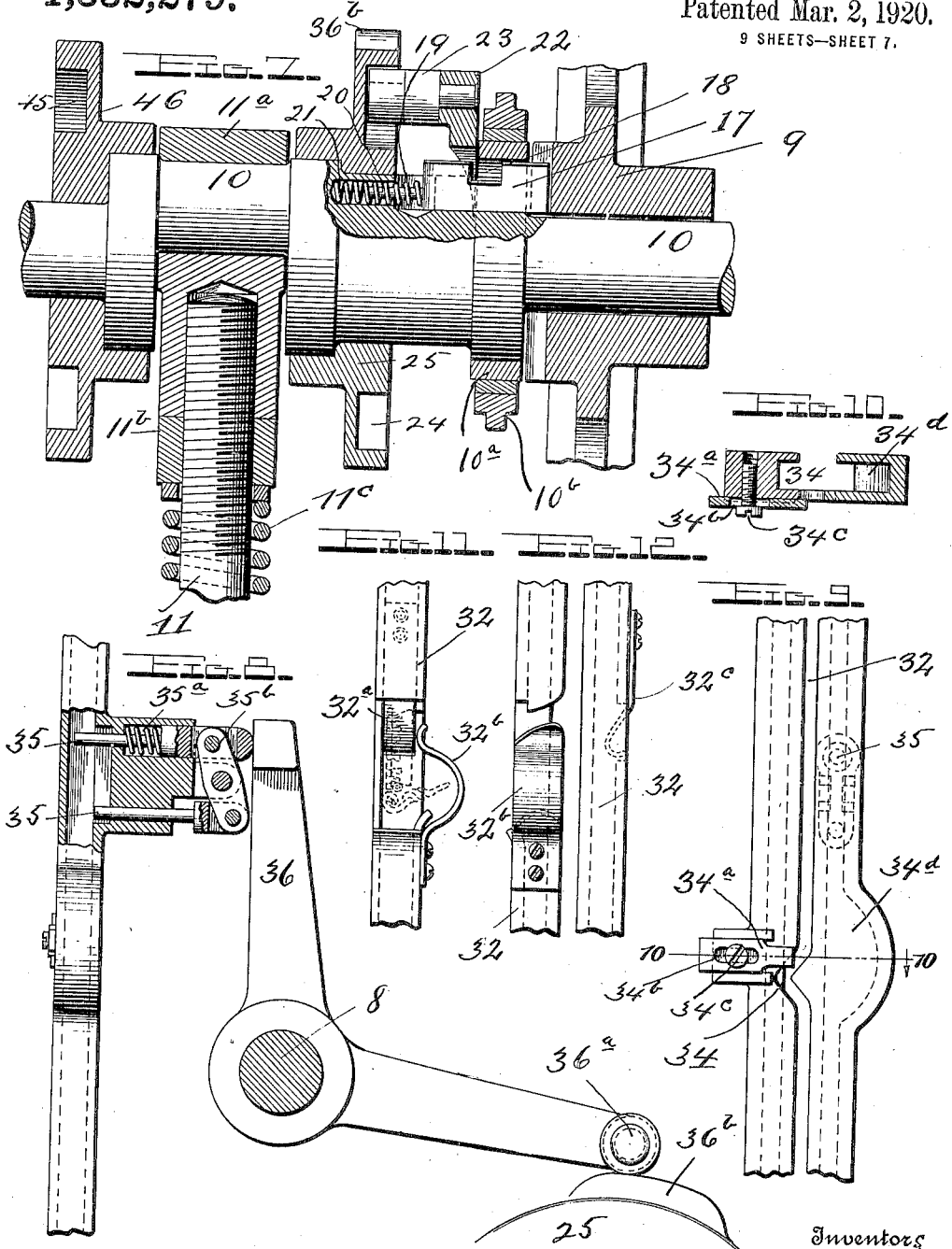

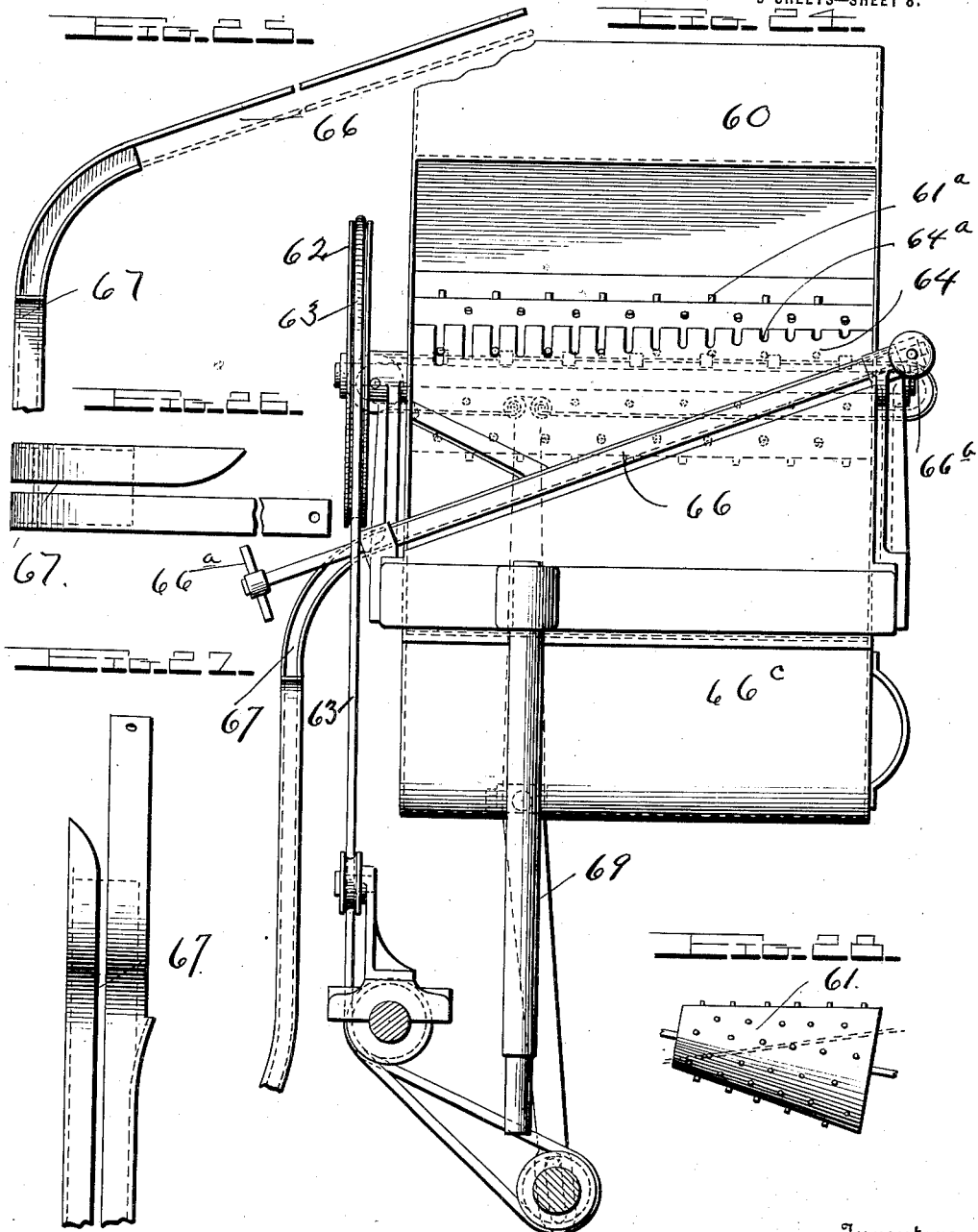

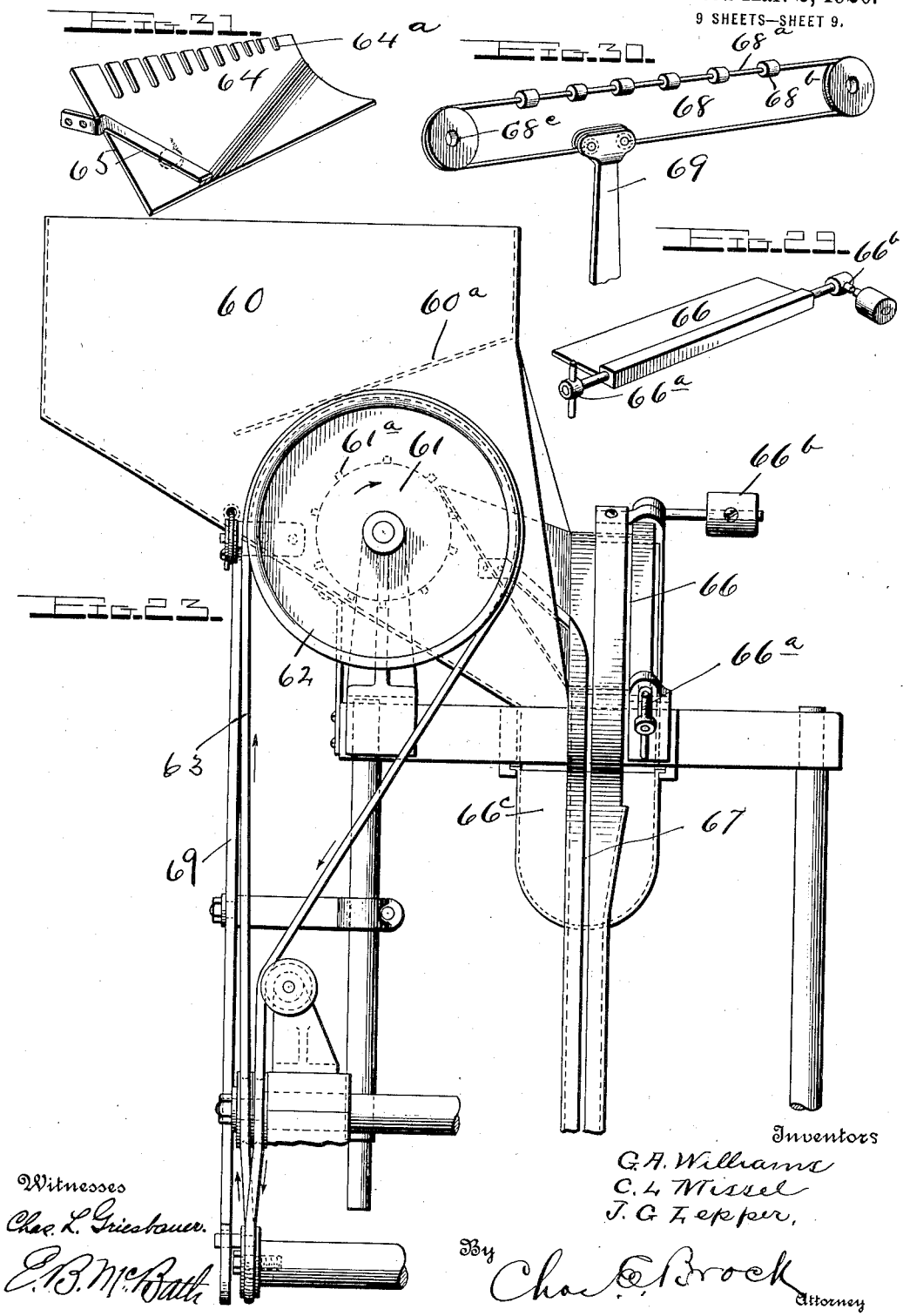

UNITED STATES PATENT OFFICE.

GEORGE A. WILLIAMS AND CHARLES L. MISSEL, OF WATERBURY, AND JOHN G. LEPPER, OF BRIDGEPORT, CONNECTICUT, ASSIGNORS TO THE WILLIAMS SEALING CORPORATION, OF WATERBURY, CONNECTICUT, A CORPORATION OF CONNECTICUT.

BOTTLE-CAPPING MACHINE.

1,332,279.            Specification of Letters Patent.      Patented Mar. 2, 1920.

Application filed October 16, 1913. Serial No. 795,430.

*To all whom it may concern:*

Be it known that we, GEORGE A. WILLIAMS, and CHARLES L. MISSEL, of Waterbury, in the county of New Haven and State of Connecticut, and JOHN G. LEPPER, of Bridgeport, in the county of Fairfield and State of Connecticut, have invented a new and useful Improvement in Bottle-Capping Machines, of which the following is a specification.

This invention relates generally to bottle capping machines and more particularly to a machine designed for applying and fastening bottle caps such as shown and described in Williams Patent #873,646.

The object of the present invention is to provide a machine for the purpose of quickly and accurately applying and fastening bottle caps of the character described to bottles placed by hand or otherwise upon the machine, the caps being delivered in bulk into a hopper, the delivery mechanism of the machine selecting the caps from the hopper and delivering them in proper order to the capping portions of the machine.

One of the objects of the invention is to provide a machine in which various sizes and styles of bottles can be arranged and capped, and another object of the invention is to provide for the steady and even selection and delivery of the caps from the hopper to the capping mechanism; and a still further object is to provide means for feeding or delivering these caps in their proper positions.

Another object of the invention is to provide a machine which will make one complete capping operation and then automatically stop thereby preventing any over feeding of the machine and consequent waste of material, which might tend to impair the operation of the machine as a whole.

Another object of the invention is to provide a machine of such construction that the proper manipulation and positioning of the bottle to be capped will start the capping operation, which as before stated will upon its completion stop the movement of the entire machine.

Another object of the invention is to provide for feeding the caps one at a time to the capping mechanism thereby avoiding choking of the feed or delivery chute.

Another object of the invention is to provide various novel forms of means for selecting and delivering the caps one at a time from a hopper into which the caps are dumped in bulk, and a still further object is to provide for the return of any surplus of selected caps which cannot be delivered to the feed or delivery chute in the capping mechanism.

The invention also has certain other objects of accomplishment which will appear during the description of the machine.

With these various objects in view the invention consists in the novel features of construction and in the novel arrangement or combination of the various elements, all of which will be fully described hereinafter and pointed out in the claims.

In the drawings forming a part of this specification:

Figure 1 is a front view of a machine constructed in accordance with our invention.

Fig. 2 is a side view of the same.

Fig. 3 is a partial top plan view partly in section.

Fig. 4 is a detail sectional elevation on the line 4—4 of Fig. 3.

Fig. 5 is a detail section partly in elevation on the line 5—5 of Fig. 3.

Fig. 6 is a detail sectional elevation on the line 6—6 of Fig. 3.

Fig. 7 is a detail sectional view partly in elevation on the line 7—7 of Fig. 3, and illustrating details of the clutch mechanism.

Fig. 8 is a detail view of means for feeding one cap at a time to the capping mechanism.

Fig. 9 is a detail front view of a portion of the cap chute showing the offset and means for righting any caps which may be improperly positioned in passing through the chute.

Fig. 10 is a detail sectional view on the line 10—10 of Fig. 9, and

Figs. 11 and 12 illustrate details of the upper end of the cap chute for returning any surplusage of caps to the hopper.

Fig. 13 is a detail view of the lever turning finger and shaft for actuating the same.

Fig. 14 is an end view of the same.

Fig. 15 is a top plan view of the cap chute.

Fig. 16 is a detail view showing a portion of the cap receiving chuck, and

Fig. 17 is a top plan view thereof,

Figs. 18, 19 and 20 are detail views of springs employed in connection with the cap receiving chuck, and Fig. 21 is a detail rear elevation of the bottle support, and Fig. 22 is a detail top plan view of the same.

Fig. 23 is a front elevation of a modified form of hopper and cap delivery mechanism.

Fig. 24 is a side view of the same.

Fig. 25 is a detail view of the upper end of the delivery chute used in connection with this modified form of hopper and delivery mechanism.

Fig. 26 is a top plan view of said top portion of the delivery chute, and

Fig. 27 is a face view of the same.

Fig. 28 is a detail view showing a modified manner of arranging the comb drum.

Fig. 29 is a detail view of a drop for relieving surplusage or over feeding of the caps.

Fig. 30 is a detail view illustrating the agitator for keeping the caps agitated within the hopper, and Fig. 31 is a detail view of the cap delivery slide whereby the caps are directed from the drum to the slide.

Fig. 32 is a perspective view of one of the caps applied to a bottle.

In the practical embodiment of our invention we employ a suitable base or support 1 embodying a platform or table and supporting legs and rigidly attached to this platform or table are the uprights 2, the size and shape of such uprights being such as to provide suitable bearings and connections for the various parts of the machine hereinafter described. The working parts of the machine are driven from an electric motor 3 which is mounted upon the table or platform between the uprights, and the motor shaft extends through one of the uprights and is provided with a pulley 4 around which passes a belt 5 and transmits the power to the large pulley 6 mounted upon the end of the power shaft 7, this shaft 7 having a small gear 8 keyed thereon which small gear meshes with a larger gear 9 mounted loosely upon a compound crank shaft 10 and brought into operative engagement with said crank shaft by a clutch mechanism more fully described hereinafter. This crank shaft imparts through various elements directly and indirectly connected therewith various motions for accomplishing the capping operation and one of the first is the upward movement of the bottle so as to force the mouth thereof into engagement with the cap and for the purpose of accomplishing this operation we connect a pitman 11 to the one portion of the crank shaft 10 the lower end of this pitman being connected to a forked rocking lever 12, pivoted beneath the platform or table the forward end of said lever being in operative engagement with a vertically movable spindle 13 which has mounted upon its upper end a bottle support 14, said support carrying adjustable wings 15 into which the bottle is forced after being placed upon the support 14 in order to give the bottle its proper relative position. The pitman 11 is connected to the cranked portion of the crank shaft 10 by the usual form of divided coupling 11$^a$ and the pitman proper consists of a sleeve and a threaded rod working therein and having a definite amount of adjusting movement with reference to each other, this adjusting movement being accomplished through the medium of a split threaded collar 11$^b$ arranged above the spiral spring 11$^c$ which surrounds the threaded rod and bears upon the top of the sleeve portion of the pitman and by the adjustment of this spring 11$^c$ the amount of compression placed upon the bottle is regulated. The range of movement of the bottle support is regulated by means of two spools 13$^a$ which are adjusted upon the threaded portions 13$^b$ of the spindle 13, the block 13$^c$ with which the forward end of the fork lever engages being held between the spools 13$^a$ and movable freely upon the intermediate portion of the spindle. The position of this block therefore upon the spindle governs the amount of upward movement of the bottle and the amount of compression exerted upon the bottle is controlled by the adjustment of the spring 11$^c$ as previously stated. The platform 14 is bolted or otherwise secured to the top of the spindle and the bottle supporting wings 15 are two in number and are pivotally connected to each other and to the platform through the medium of a bolt 16, said bolt having a T-shaped head 16$^a$ at its lower end which works in a T-shaped slot 14$^a$ cut in the rear side of the platform 14, and by means of which the wings can be moved back or forward to the desired position and when the bolt is loosened for the purpose of permitting this longitudinal adjustment the wings are sufficiently loosened to permit any lateral adjustment desired and when the bolt is tightened the supporting wings are locked not only with reference to each other but also with reference to the platform and by means of this dual adjustment almost any size or shape bottle can be accommodated within definite limits.

As previously stated we employ a clutch mechanism for the purpose of causing the machine to make one complete revolution and then automatically stop the operation of the machine and in the construction of this clutch mechanism we employ a key 17 which slides in a groove cut in the crank shaft 10 and which key is adapted to engage the hub of the gear wheel 9 for the purpose of locking said wheel and crank shaft together for the purpose of making the one rotation. This key 17 has a notch 18 cut in the upper side thereof about midway its length for the purpose hereinafter explained, and the reduced end 19 of the key 17 is surrounded by a coil spring 20, said reduced end and spring being positioned in a socket 21 cut in the crank portion of the shaft.

A cam 25 is mounted upon the crank shaft and has a cam groove 24 which is adapted to be engaged by a roller 23 carried upon the end of the disengaging level 22, said lever being pivoted at $22^a$ to a bracket $22^b$ which bracket is secured to one of the cross pieces connected to the uprights of the machine. The lever 22 has an elbow extension 26 to which is connected a rod 27 which in turn is connected to a lever 28 pivoted at $28^a$ upon a depending bracket and provided with a finger 29 which extends adjacent to the chuck so that as the mouth of the bottle is moved up to put the same into the proper position for receiving the cap this finger can be actuated, tripping the lever 28 and through the means of the rod 27 lifting the lever 22 out of engagement with the clutch thereby permitting the same to become operative and causing the machine to make one complete movement, it being understood that the moment the lever 22 is lifted the spring actuated key will be forced into engagement with the hub of the gear 9 and thereby rotate the crank shaft. The end of the lever 22 is tapered and it will of course be understood that when the pressure is relieved from the finger 29 this free end of the lever 22 drops back and as the crank shaft comes around at the completion of its revolution the tapered end will pass into the notch 18 and the continued movement of the slotted key upon the tapered end of the lever will cause the said key to be moved to the left, see Fig. 7, thereby withdrawing this key 17 out of engagement with the hub of the gear 9. A disk $10^a$ is placed upon the crank shaft adjacent the gear 9 which is surrounded by a brake band $10^b$ so that the movement of the crank shaft will be quickly checked as soon as the key 17 is drawn out of engagement with the hub of the gear 9.

When the tapered end of the lever 22 is raised so as to release the spring actuated key the roller 23 is elevated into the cam groove 24 and as the cam travels in the direction of the arrow, see Fig. 4, this roller will continue in the circular portion of the groove until it is engaged by the inwardly projecting shoulder $24^a$ which shoulder causes the roller and lever to be drawn inwardly or downwardly so as to bring the tapered end into proper position for engaging the notch 18 of the spring actuated key 17. The cam finally stops with the roller at the interior shoulder $24^b$. The cut out portion $24^c$ permits the lever and roller to be elevated sufficiently to release the clutch when the actuating finger 29 is tripped by the neck of the bottle.

The caps which are to be placed upon the mouth of the bottle and fastened thereon embody a slotted skirt or apron, an encircling wire band, and a cam lever for contracting the band and apron upon the neck or mouth of the bottle and special mechanism must be employed for rapidly and accurately feeding these caps to the chuck and we will now describe the means for accomplishing this portion of the operation of the machine.

The caps are deposited loosely in a hopper 30 which is supported at each side upon uprights $2^a$ which extend upwardly from the uprights 2 and at the rear this hopper is supported by a brace $1^a$ which extends upwardly and rearwardly from the table or platform 1. The hopper is rectangular in shape and the lower portion thereof is tapered toward the rear so that the caps will mainly accumulate in the lower contracted end of the hopper, the lower portion being provided with a shelf like portion $30^a$ on opposite sides of a central hood $30^b$. An opening $30^c$ is produced in the extreme lower end of the hopper bottom and traveling through this opening is an endless belt 31 passing over the roller $31^a$ at the upper end and $31^b$ at the lower end. This endless belt or rotating member 31 has pins $31^c$ extending therefrom, which pins are adapted to engage a cap and pick the same up and carry it up over the roller $31^a$, this roller being mounted upon a shaft journaled in a bracket $31^d$ which connects the uprights $2^a$ and is formed with a forward extension to which the cap chute 32 is attached said chute being in the form of a compound curve extending from the roller $31^a$ to the cap chuck 39, and in cross sectional area this chute is of such size and shape as to accommodate the cap of the construction heretofore described. This chute is slotted along its front as shown to accommodate the lever which projects at right angles to the cap.

Adjacent the upper end of the chute there is an opening $32^a$ for the purpose of permitting any overflow of caps to be directed to an overflow chute 33 by means of which they are conducted back into the hopper 30 and to accomplish this a curved plate $32^b$ is arranged across the opening $32^a$ and in addition a second plate $32^c$ is employed which projects into the chute from one side so that if the chute be full of caps up to the opening $32^a$ all caps delivered from the endless rotating member will be directed off to one side and returned to the hopper. It is necessary that these caps should pass through the chute in such position that the body portion of the cap will extend forwardly and the lever to the rear and inasmuch as the endless delivery member is liable to discharge the cap into the chute either end uppermost we provide for reversing the position of all improperly positioned caps and this is accomplished by forming the chute with an offset 34 as most clearly shown in Fig. 9, the slot at this point being angled and adjacent this offset portion is a stop 34ª slotted as shown at 34ᵇ and attached to the chute by means of a screw 34ᶜ. This offset and stop retard the improperly placed caps just long enough to permit the body portion of the cap to swing around and become lowermost, the opposite side of the chute being enlarged as shown at 34ᵈ to permit this rotating or swinging movement of the cap within the chute. This construction and arrangement of parts insures all of the caps passing through the chute in proper position, it being understood that a cap which is properly positioned in the first instance will pass by the offset and stop without reversing whereas a cap which is improperly placed will be retarded and reversed into proper position. For the purpose of feeding only one cap at a time we provide two stop pins 35 which are adapted to project into the chute and are spaced apart just sufficiently to permit one cap to rest between them. The lowermost pin normally rests within the chute and supports the entire line of caps within the chute, and this bottom pin 35 is held in this position by means of a spring 35ª which surrounds the upper pin and tends to project the lower pin inwardly, the two pins being connected by means of a link 35ᵇ and the upper pin is operated upon by one arm of an elbow lever 36, the opposite end of said elbow lever having a roller 36ª which engages a cam projection 36ᵇ mounted upon the cam 25, this projection being so positioned that the lever 36 will be operated at the proper time to push the upper pin 35 inwardly withdrawing the lower one and permitting one cap to drop and descend to the chuck while the remainder of the caps are supported within the chute. After the cam 36ᵇ has passed, the lever 36 will be removed from the upper pin sufficiently to permit its spring to operate and through the medium of the link 35ᵇ force the lower pin in to support the entire line of caps. After the cap has passed by the offset 34 it slides down the chute to the extreme lower end thereof where it is received and held between two spring plates 37, these plates being attached to the exterior of the chute and passing through the openings 37ª into the chute so as to engage the cap and hold the same at the extreme lower end of the chute ready to be forced over into the cap receiving chuck. This chuck consists of two spring jaws 38 projecting inwardly from the lower ends of the plates 38ª, which plates are bolted upon opposite sides of a spindle 38ᵇ bolted to one of the cross members of the frame and upon the forward side of this spindle is bolted the neck receiving hood 39 which is made flaring at its lower end in order to readily receive the mouth of the bottle. The cap which has been arrested by the springs 37 at the end of the chute is pushed over from the end of the chute between the jaws 38 and forced into the chuck until it occupies the position directly beneath the spindle portion of the chuck and it will be noted that the flanged portion of the hood 39 is slotted longitudinally as shown at 39ª in order to accommodate the lever and at one side the flaring portion is cut away as shown at 39ᵇ in order to permit the movement of the lever fastening finger as hereinafter described.

The cap is pushed from the end of the chute into the chuck by means of a pusher 40 which is notched at its forward end to engage the lever portion of the cap and this pusher is rigidly secured to a slide 41 which works in a suitable guide box fastened to the frame. This slide 41 is actuated by means of a lever 42 which in turn is operated by a slide 43 carrying a roller 44 at its rear end which engages the cam groove 45 of the cam 46 mounted upon the crank shaft, this cam being of such shape and so positioned that the pusher will be forced forwardly just in time to place a cap in the chuck head as the bottle neck approaches the same.

After the cap has been pushed into the chuck the mouth of the bottle is forced into the cap through the medium of the bottle suport, spindle, lever and pitman and when the cap has been forcibly pressed upon the mouth of the bottle the fastening lever is turned down to complete the fastening of the cap upon the bottle and this turning operation is accomplished through the medium of the cam 47 having a groove 48 in which travels a roller 49 mounted upon the rear end of a slide 50, the forward end of said slide having rack teeth 51 cut thereon which rack teeth engage a pinion 52 rigidly mounted upon the shaft 53 which carries a crank arm 54 at its opposite end, said crank arm carrying a finger 55 which is adapted to engage the lever and turn the same down, this movement of the finger being permitted by the cut out portions of the chuck head. The finger is turned so as to effect the complete fastening of the cap upon the bottle and then the return movement of the slide 50 causes this finger to travel back to its normal raised position. It will be understood that at the completion of the capping operation the tapered end of the lever 22 engages the slot 18 by the key 17 and throws the clutch out of engagement and the operative mechanisms of the machine remain stationary until the tripping finger 29 is once more actuated by pressing thereupon with the neck of the bottle and then all of the operations heretofore described in detail take place, namely, the feeding of the cap to the chuck, the moving of the bottle upwardly into engagement with the cap and then the fastening of the lever so as to completely seal the cap upon the mouth of the bottle. The bottle is of course held in the hands when the tripping lever is being actuated and the bottle positioned upon the support and is so held during the capping and sealing operations and when the operation has been completed it is removed by hand another bottle grasped and the operations continued so that the speed with which the capping operation can be accomplished is dependent only upon the speed with which the operator can feed and remove the bottle from the machine.

It will thus be seen that we provide a simple, durable and efficient machine for quickly and easily applying and fastening bottle caps of the special construction to the mouths of bottles.

In Figs. 23 to 31 we have shown a slightly modified form of mechanism for removing the caps from the hopper and delivering them to the cap chute and in this modified form of construction we employ a hopper 60 in which the rotating member 61 may be in the form of a cylinder or cone and is provided with pins 61$^a$. A drive wheel 62 is mounted upon the end of the cylinder or cone shaft and is driven from an endless belt 63 which receives its motion from the pulley connected with the power shaft in any suitable manner. The caps are moved from the cylinder or cone by means of a stripping plate 64 having a toothed or slotted edge 64$^a$ and a guide finger 65 arranged adjacent the forward end for the purpose of directing the caps to the track 66 from which they slide into the chute 67 which is the same as the chute 32 in all other respects. The track 66 is pivoted and has an operating handle 66$^a$ at the forward end and a counterweight 66$^b$ for maintaining it normally in a horizontal position and this track is pivoted so as to dump any surplus caps into a draw 66$^c$ arranged beneath the track 66. For the purpose of keeping the caps stirred up and prevent clogging we employ an agitator 68 consisting of an endless cord or cable 68$^a$ having knobs 68$^b$ attached thereto and this cord or cable passes around pulleys 68$^c$ mounted upon the side of the hopper and is connected to a lever 69 which lever is pivoted and is operated from its lower end to cause the same to swing back and forth so as to cause this agitator to be constantly in motion within the hopper.

In Figs. 23 and 24 we have shown the cylindrical form of feed roller whereas in Fig. 28 we have illustrated a conical form, this form being employed for the purpose of more evenly distributing the caps along the line of the track 66. After the caps have once been delivered to the cap chute the operations of the machine are exactly the same as those previously described, this form of hopper and feed mechanism being illustrated and described to show that our invention is capable of various modifications and adaptations without departing from the broad spirit thereof.

In Fig. 32 we have shown one of our caps in locking position on a bottle, the cap B being the form of cap which our machine is adapted to feed and apply to a bottle A.

What we claim is:

1. In a bottle capping machine, a cap delivery chute provided with means at its lower end for holding a cap having a lever, a reciprocating pusher adapted to engage said cap, a chuck adapted to receive said cap when so pushed, and cut out to receive the lever, means for operating said pusher and means for bringing said lever into locking position while the cap is within the chuck.

2. A bottle capping machine comprising a vertically movable bottle support, a chuck arranged in vertical alinement with said support, said chuck comprising a hood, the chuck being adapted to receive a cap, and the hood being cut away to receive a fastening lever carried by the cap, means for delivering said caps to the chuck when a bottle is placed upon said support, and means for throwing the cap lever into locking position while within said chuck.

3. In a bottle capping machine, the combination with a cap chute, of a cap chuck, means for moving a cap from said chute to said chuck, said cap having a movable locking lever, a movable bottle support, a tripping lever adjacent said cap chuck, together with means operatively connected with said lever for moving said bottle support and feeding said cap, and means operative upon said cap lever, when said cap and chuck are brought into engagement.

4. A bottle capping machine comprising in combination a feed hopper, a slotted cap chute leading from said hopper, a chuck arranged at the lower end of said chute and adapted to receive a cap having a lever therein, a pusher for moving said cap, a turner for turning a lever of cap while said cap is held in chuck, a bottle support movable with reference to said chuck, means for moving said pusher and operating said lever turning mechanisms operative connection between said pushing, turning and supporting mechanisms, together with means for arresting the mechanisms upon the completion of the capping operation.

5. A bottle capping machine comprising in combination a feed hopper, a slotted cap chute leading from said hopper, a chuck arranged at the lower end of said chute and adapted to receive a cap having a lever therein, a pusher for moving said cap, a turner for turning the lever of the cap while said cap is held in chuck, a bottle support movable with reference to said chuck, means for moving said pusher and operating said lever turning mechanisms operative connections between said pusher, turner and movable support together with means for arresting the mechanisms upon the completion of the capping operation together with a starting lever adjacent said chuck for starting said mechanisms in operation.

6. In a bottle capping machine a slotted cap chute, the slot thereof being off-set intermediate its ends and having a stop arranged adjacent said off-set upon the exterior of the chute, for the purpose specified.

7. In a device of the kind described, the combination with a cap chuck, of a chute adapted to deliver a cap adjacent said chuck, a pusher for introducing said cap into the chuck, a rotatable shaft carrying a finger, said finger being adapted to engage a lever carried by the cap, a slide for rotating said shaft, together with means for actuating said slide, as set forth.

8. In a device of the kind described, the combination with a delivery chute and chuck, of a pusher adapted to transfer a cap from the chute to chuck, a slide to which said pusher is attached, means for operating said pusher means carried by the power shaft for actuating said pusher operating mechanism, a second slide carrying a rack bar, a shaft provided at one end with a pinion and at the other end with a crank arm, said crank arm carrying a finger, all of said parts being adapted to operate as set forth.

9. In a bottle capping machine the combination with a cap chuck and means for feeding a cap thereto, of a bottle support and means for moving said support upwardly, a tripping finger arranged adjacent to the cap chuck and adapted to be engaged by a bottle neck, a power shaft, and a clutch mechanism arranged thereon, and an operating rod connecting the tripping finger and clutch mechanism for the purposes specified.

10. In a bottle capping machine the combination with a cap chuck and means for feeding a cap thereto, a tripping lever arranged adjacent said chuck, an operating rod connected with said tripping lever, a power shaft, a gear mounted thereon, a clutch key adapted to engage the hub of said gear, said key being spring actuated, a lever having a tapered end adapted to engage said clutch key, said lever carrying a roller, and a cam mounted upon said power shaft and adapted to engage said roller.

11. In a bottle capping machine, the combination with a movable bottle support, of a cap receiving chuck, means for feeding a cap into said chuck, means for bringing a bottle into engagement with said cap in said chuck, and means independent of said chuck for operating upon said cap when said cap and bottle are in engagement.

12. In a bottle capping machine the combination with an adjustable bottle support and cap receiving chuck movable one with reference to the other, a longitudinally slotted cap chute adapted to guide a cap having a movable part, means for moving a cap from said chute to said chuck, and means independent of said chuck for operating upon said movable part subsequent to the introduction of the bottle neck into said cap.

GEORGE A. WILLIAMS.
CHARLES L. MISSEL.

Witnesses:
BEATRICE GILHULY,
LILLIAN SWENSON.

JOHN G. LEPPER.

Witnesses:
CHARLES L. HOLMES,
GRACE E. ANDREWS.